May 3, 1966 L. DIETCH 3,249,795

AUTOMATIC DEGAUSSING CIRCUIT FOR COLOR RECEIVERS

Filed Aug. 31, 1964

Inventor
Leonard Dietch
By
Nicholas A. Camasto
Atty.

United States Patent Office 3,249,795

Patented May 3, 1966

3,249,795
AUTOMATIC DEGAUSSING CIRCUIT FOR COLOR RECEIVERS

Leonard Dietch, Skokie, Ill., assignor to Admiral Corporation, Chicago, Ill., a corporation of Delaware Filed Aug. 31, 1964, Ser. No. 393,061
5 Claims. (Cl. 315—8)

This invention relates in general to color television receivers and in particular to color television receivers having pictures tubes which are susceptible to the influence of magnetic fields. More specifically, the invention is concerned with providing means for automatically demagnetizing or degaussing a picture tube of a color television receiver during the normal course of receiver operation.

Conventional three-gun shadow mask type picture tubes incorporate shadow masks constructed of magnetically permeable material including a large number of apertures through which the electron beams pass. The tube is also generally provided with an externally mounted magnetic shield and, in practical applications, is located close to its chassis which also generally comprises magnetically susceptible material. In particular, the shadow mask, shield and chassis are susceptible to the earth's magnetic field and the effects thereof must be neutralized when installing a receiver. This is normally a service operation during which a serviceman subjects the television receiver to a decreasing alternating flux field with the receiver in its operating environment. This procedure is necessary in order to assure proper beam landings in a tri-gun color tube.

The theory and art of demagnetization are well known and we need only be concerned here with the criteria. These are that the initial field be strong enough to fully overcome any previous magnetization and that the field be progressively reduced to zero in a cyclical manner.

Once the set has been demagnetized or degaussed, it should be maintained in the same relative position with respect to the earth's magnetic field. Further, the influence of stray magnetic fields such as those produced by small electric motors may upset the magnetic condition of the picture tube and associated equipment and require further demagnetization. This represents one of the major disadvantages of conventional color television receivers—the requirement that they remain in a relatively fixed position. Substantial movement of the receiver will generally necessitate further demagnetization.

The invention provides means for automatically degaussing the color television receiver color picture tube and proximately located shielding elements each time the receiver is turned on from a substantially "cold start." This is accomplished by providing a pair of degaussing coils arranged circumferentially about the picture tube and supplying these coils with a tapered high amplitude alternating current for demagnetization.

Accordingly, the primary object of this invention is to provide means for automatically demagnetizing the picture tube of a color television receiver.

Another object of this invention is to provide means for automatically demagnetizing the picture tube of a color television receiver, which means are operable each time the television receiver is operated.

A feature of this invention resides in means for allowing only the inrush current of the color television receiver's power supply to pass through the demagnetizing coils.

Further objects and features of this invention will be apparent upon reading the specification in conjunction with the drawing in which.

Figures 1, 2:
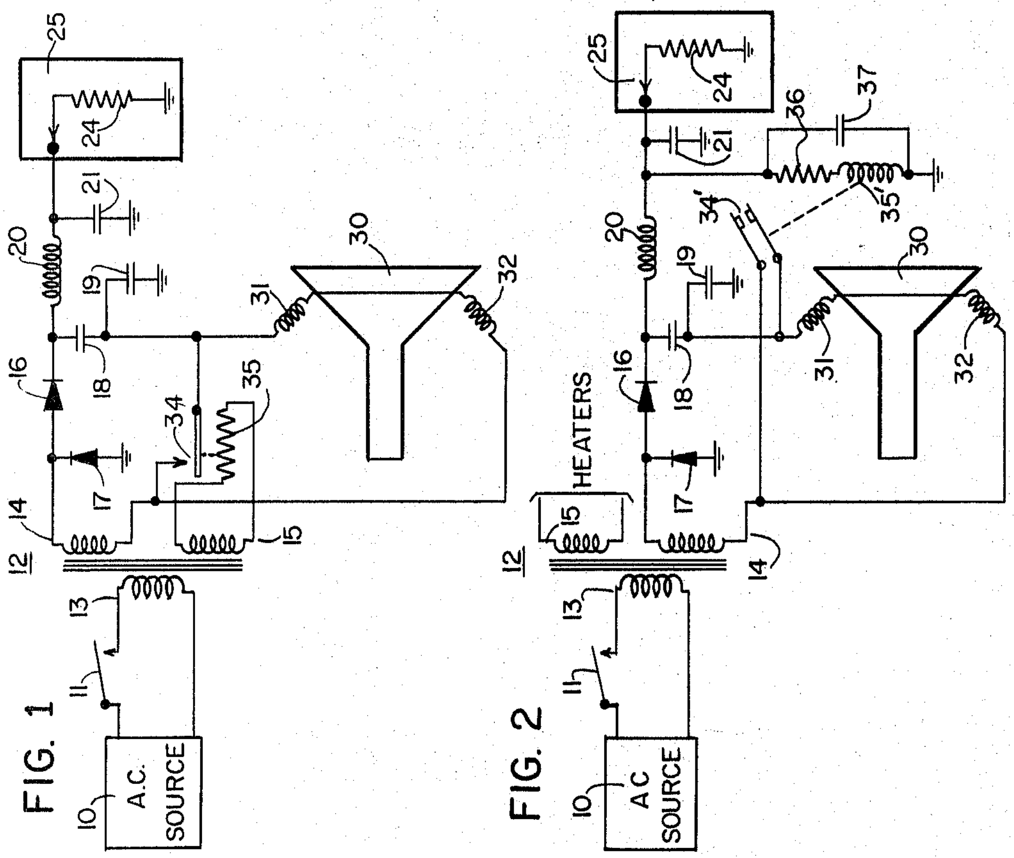
FIGURE 1 is a schematic diagram of an embodiment of the invention connected in a partially disclosed television receiver.
FIGURE 2 is a similar diagram showing a different embodiment of the invention.

Referring now to FIGURE 1, an alternating current source 10 is connectable through a switch 11 to a power transformer 12 of a conventional color television receiver. For purposes of description, it is not necessary to disclose the component parts of the television receiver other than the power supply and the picture tube. Consequently, both FIGS. 1 and 2 should be understood to be partial representations of the schematic diagrams of a color television receiver. Transformer 12 has a primary winding 13, a high voltage secondary winding 14 and a low voltage secondary winding 15. High voltage secondary winding 14 feeds a voltage doubler arrangement comprising a pair of diodes 16 and 17 and a pair of capacitors 18 and 19. Neglecting for the moment the other elements interposed between secondary winding 14 and the junction of capacitors 18 and 19, the arrangement will be seen to be a common voltage doubler which is well known in the art for developing a direct current voltage approximating twice the peak alternating current voltage amplitude appearing across transformer winding 14. This basic circuitry is not believed to need detailed description. Secondary winding 15 supplies the heaters of the various vacuum tubes (not shown) in the television receiver and also supplies a resistance element 35.

The filter circuit for the direct current developed by the voltage doubler further consists of a choke coil 20 and an additional capacitor 21. It will be readily recognized that other filter elements may be employed and different power supply arrangements utilized with equal facility. A box 25 including a resistance 24 is shown connected to the output of the filter. Resistance 24 represents the load that the television receiver circuitry imposes upon the power supply.

A pair of demagnetizing coils 31 and 32 are shown flanking a picture tube 30 and are serially connected between transformer winding 14 and the junction of capacitors 18 and 19. A set of contacts 34 are connected in parallel with the pair of degaussing coils 31 and 32. Contacts 34 are thermally actuated, the particular construction thereof not being essential to this invention. These normally open contacts are placed in heat exchange relationship with resistance element 35 and when resistance element 35 achieves a predetermined temperature, contacts 34 close.

Figure 3:
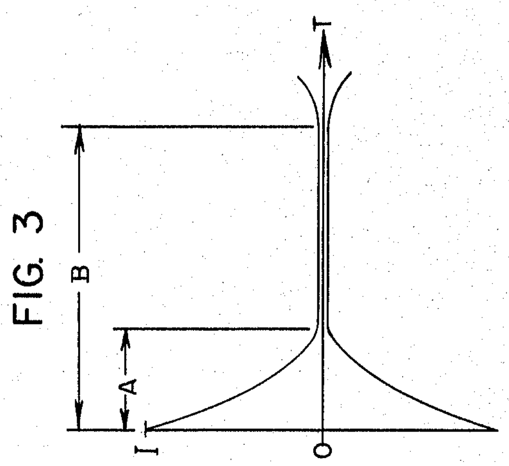
FIGURE 3 is a graph pictorially representing the inrush current of the television receiver.

Referring to FIGURE 3 for a moment, there is shown a graph indicating the amplitude of the current in secondary winding 14 as a function of the time after turn on of the television receiver (closure of switch 11). In power supply arrangements similar to the ones shown, the inrush current is very high and may have an initial amplitude on the order of seven times the normal operating current for the receiver. This high amplitude current is primarily required for charging the filter capacitors. The inrush current rapidly decays to a minimum value near zero, this value being determined by the "bleeder-load" resistance of the television receiver. The high initial amplitude and rapid decay is indicated by the section of the graph labelled "A." The time interval represented by A is approximately two seconds. The minimum current persists until the television receiver vacuum tube cathodes are sufficiently warm to begin emitting electrons. When this occurs, current in winding 14 begins to rise toward a steady state value. In practice the current will vary for a short time since the various vacuum tubes will not all commence operating simultaneously. The segment of the graph labelled "B" represents approximately 14 seconds and indicates the normal time required for the television receiver to begin drawing tube current. The foregoing assumes that the television receiver is started from a cold start, that is, all of the elements are at substantially ambient temperature.

It is seen from the graph of FIG. 3 that a natural current decay characteristic exists by virtue of the inrush current of the television receiver. The invention utilizes this natural phenomenon to provide a high initial amplitude-rapidly diminishing alternating current for producing a strong demagnetizing field about the picture tube.

In operation, thermally actuated contacts 34 are normally open. Upon closure of switch 11, winding 14 experiences an inrush current, having the above described characteristics, for charging filter capacitors 18 and 19. Since contacts 34 are open, this current flows through demagnetizing coils 31 and 32 which establish a demagnetizing flux field about picture tube 30. Resistance element 35 and contacts 34 are selected such that contacts 34 open approximately six seconds after closure of switch 11. From FIG. 3 it will be seen that at this time the current in winding 14 is at a minimum and, consequently, the demagnetizing field produced by coils 31 and 32 is at a minimum. Upon closure of contacts 34 the demagnetizing coils are shorted out and no further current passes therethrough. Consequently, picture tube 30 is subjected to a short duration demagnetizing field each time the television receiver is turned on from a cold start. Contacts 34 are held in a closed condition as long as the temperature of resistance element 35 is at or above said predetermined temperature.

In FIGURE 2 a somewhat different arrangement for achieving the same result is shown. In this figure similar elements are given like reference characters. The circuitry is identical in operation with the exception of contacts 34' which are operated by a relay winding 35' instead of being thermally operated by a thermal device. As in the case of the circuit of FIG. 1, it is desirable to close contacts 34' about six seconds after closure of switch 11. For this purpose relay winding 35' is included in a time delay circuit. This time delay circuit comprises a resistance 36 serially connected with relay winding 35' and a capacitor 37 connected in parallel across this combination of elements. The arrangement is connected across the output of the filter, that is, the junction of choke coil 20 and capacitor 21.

Upon closure of switch 11, capacitors 18, 19 and 21 experience an increase in energy storage with a consequent increase in direct current potential thereacross, with the potential across capacitor 21 approaching twice the peak amplitude of the A.C. potential across transformer winding 14. At the end of the time interval indicated by "A" in FIG. 3, capacitor 21 is substantially fully charged. Simultaneously, capacitor 37 in the time delay network is charging and, at a predetermined time after capacitor 21 achieves a fully charged condition, capacitor 37 is fully charged and allows relay winding 35' to draw sufficient current to close its contacts 34'. The time interval is determined by the values of capacitor 37 and the resistance of resistor 36 and relay winding 35'. Upon closure of contacts 34', demagnetizing coils 31 and 32 are shorted out and disable the demagnetizing circuit as previously described with reference to FIGURE 1. During operation of the set, relay winding 35' remains energized and keeps the demagnetizing circuit disabled.

What has been described is a novel arrangement for automatically demagnetizing the color picture tube of a color television receiver during operation. It is recognized that numerous modifications and departures from the invention as described may be made by those skilled in the art without departing from the true spirit and scope thereof as defined in the claims.

The embodiments of the invention in which an exclusive property or privilege is claimed are defined as follows:

1. In combination with a color television receiver having a picture tube including permeable material susceptible to external magnetic fields; power supply means including rectifying means connected to a source of A.C. potential; demagnetizing coil means mounted in demagnetizing relationship adjacent to said picture tube and serially connected between said power supply means and said A.C. source; normally open contact means connected in parallel with said coil means; said power supply means, upon connection to said source of A.C. potential, experiencing an inrush current characterized by an initially large amplitude, said inrush current exponentially decaying toward a minimum value whereby said coil means experience a decaying A.C. current for demagnetization of said picture tube; and means operating and maintaining said contact means in a closed position after said inrush current has decayed to said minimum value.

2. In combination with a color television receiver having a picture tube including permeable material susceptible to external magnetic fields; power supply means including rectifying means connected to a source of A.C. potential; demagnetizing coil means positioned in demagnetizing relationship adjacent to said picture tube and serially connected between said power supply means and said source of A.C. potential; time delay means; switch means connected in parallel with said coil means and operable under control of said time delay means to short circuit said coil means; said power supply means, upon connection to said source of A.C. potential, experiencing an inrush current characterized by an initially large amplitude, said inrush current exponentially decaying toward a minimum value and reaching said value before said time delay means operates said switch means, whereby said coil means experience a large amplitude decaying A.C. current for demagnetization of said picture tube.

3. In combination with a color television receiver including a picture tube susceptible to external magnetic fields; a pair of demagnetizing coils mounted in demagnetizing relationship about said picture tube; a power transformer having a primary winding connected to a source of A.C. potential and a secondary winding; rectifying means including capacitance means connected to said secondary winding; means connecting said pair of demagnetizing coils in series with said secondary winding, said means including a pair of normally open contacts connected across said coils; a relay coupled to said rectifying means for closing said contacts; time constant circuit means associated with said relay for precluding operation thereof until a predetermined period of time after said capacitance means are fully charged; said power supply means, upon connection to said source of A.C. potential, experiencing a large inrush current for charging said capacitance means; said inrush current decaying exponentially toward a bleeder-load value as said capacitance means reaches a fully charged state; said relay operating after said predetermined time to close said contacts and short out said coils whereby said coils experience a large amplitude decaying A.C. current for demagnetization of said picture tube.

4. In combination with a color television receiver including vacuum tubes and having a picture tube incorporating a permeable shadow mask susceptible to external magnetic fields; a pair of demagnetizing coils mounted adjacent the face of said picture tube; power supply means including a rectifier and a capacitor connected to a source of A.C. potential; a switch connected in series with said rectifier and said capacitor, said switch normally being in an open position; said pair of coils being electrically in parallel with said switch and being short circuited by operation thereof; said power supply means experiencing current characterized by: a rapidly decaying high amplitude portion during charging of said capacitor when said television receiver is turned on, and a portion of minimum value between the time when said capacitor is fully charged and before said vacuum tubes are drawing normal currents; and means operating said switch during occurrence of said minimum value of current whereby said coils are only subject to a decaying A.C. current of said high amplitude and said minimum value for demagnetization of said picture tube.

5. In combination with a color television receiver having a picture tube including permeable material susceptible to external magnetic fields; a power supply including a transformer having a first and a second secondary winding; rectifying means connected to said first secondary winding; a pair of demagnetizing coils mounted adjacent to said picture tube, said coils being serially connected between said first secondary winding and said rectifying means; a pair of normally open thermally actuatable contacts connected across said pair of demagnetizing coils; a heat producing element mounted in heat exchange relationship with said pair of contacts and connected to said second secondary winding; said power transformer upon energization, experiencing an inrush current characterized by an initially large amplitude, said inrush current exponentially decaying toward a minimum value whereby said coil means experience a decaying A.C. current for demagnetization of said picture tube, said heat producing element reaching a predetermined temperature for operating said thermally actuated contacts and shorting out said demagnetizing coils during occurrence of said minimum value of current.

No references cited.

DAVID J. GALVIN, *Primary Examiner.*

R. SEGAL, *Assistant Examiner.*